Aug. 30, 1927.
E. S. EVANS
1,641,026
MOTOR VEHICLE TRANSPORTING BOX
Filed May 29, 1924
2 Sheets-Sheet 1
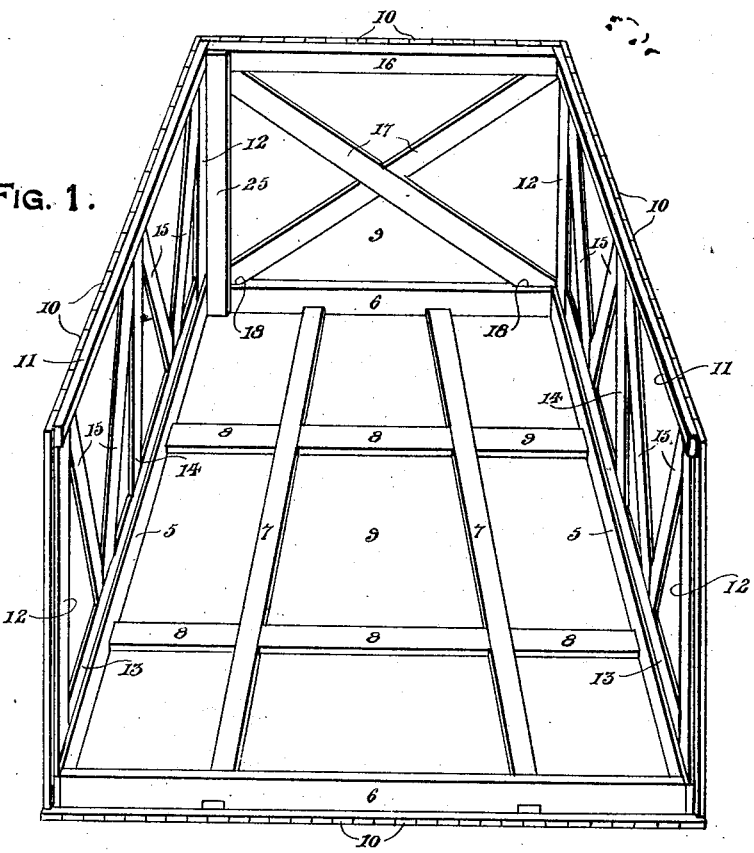
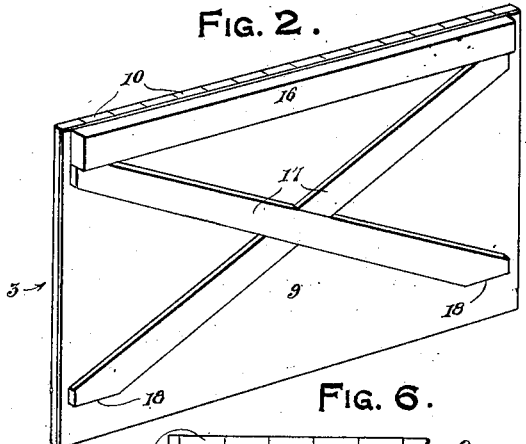
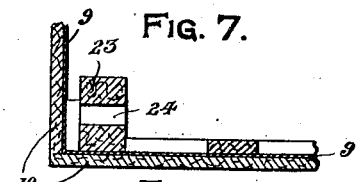
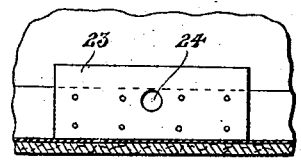
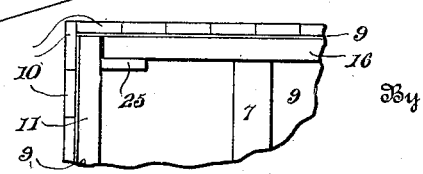
Inventor
Edward S. Evans
By
Attorney Aug. 30, 1927.
E. S. EVANS
1,641,026
MOTOR VEHICLE TRANSPORTING BOX
Filed May 29, 1924
2 Sheets-Sheet 2
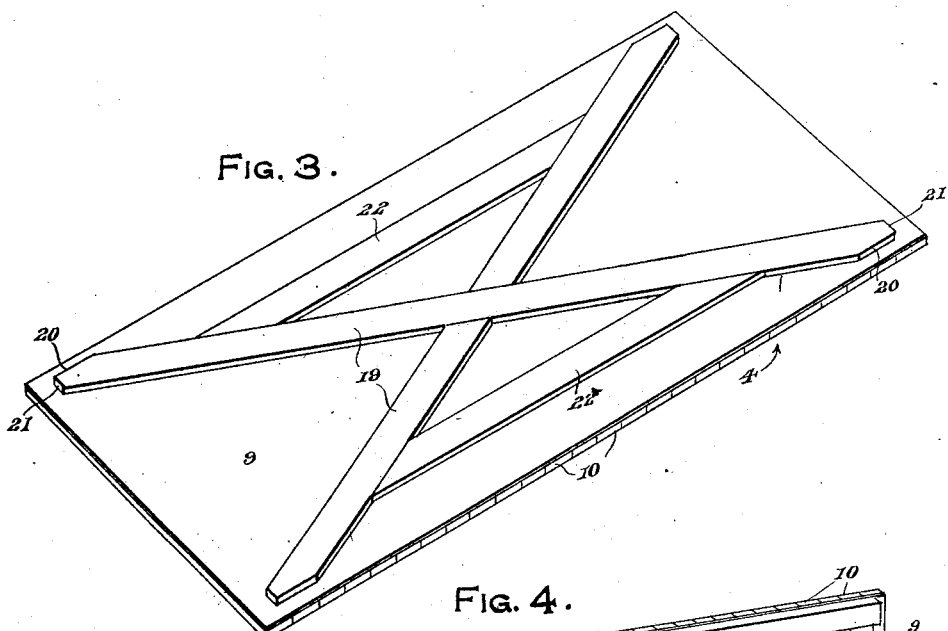
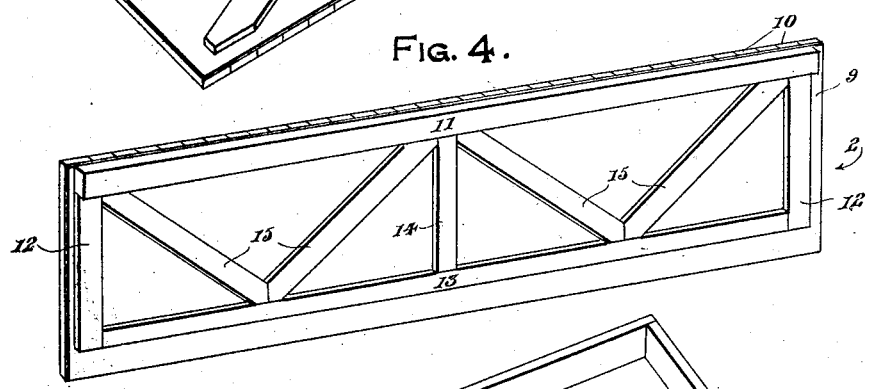
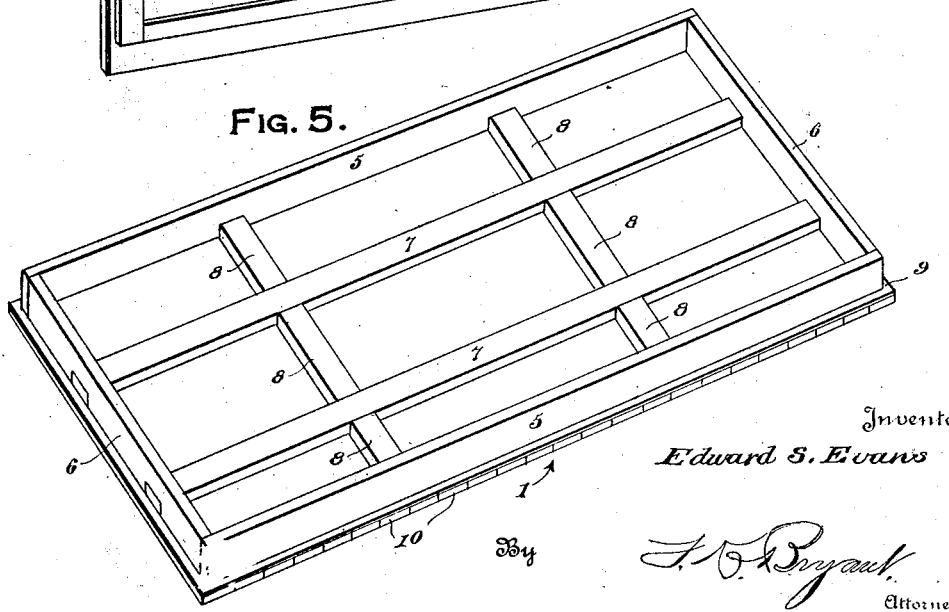
Inventor
Edward S. Evans
By
Attorney Patented Aug. 30, 1927.

1,641,026

UNITED STATES PATENT OFFICE.

EDWARD S. EVANS, OF DETROIT, MICHIGAN, ASSIGNOR TO E. S. EVANS & CO., INC.

MOTOR-VEHICLE-TRANSPORTING BOX.

Application filed May 29, 1924. Serial No. 716,816.

This invention relates to transporting boxes particularly designed for the shipping of motor vehicles and of the type set forth in Patent 1,491,595, granted to E. S. Evans on April 22, 1924 and embodies further improvements in the art thereover.

The primary object of this invention is to provide additional or strengthening brace bars for the wall sections or units comprising the box with a view of decreasing liability of damage to the several box units when shipped in a collapsed or knocked down condition and also for bracing and strengthening the box sections when set up in box formation for encasing a motor vehicle.

The box being constructed of completely preformed box sections or units has the several units thereof properly proportioned and designed so that when the several units are assembled into box formation, projecting corners or edges will be eliminated.

With the above and other objects in view that will become apparent as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a perspective view of the box with the cover and one end wall removed showing the brace bar construction of the sides, end and bottom, Figure 2 is a perspective view of an end wall of the box, Figure 3 is a perspective view showing the under side of the box cover or top, Figure 4 is a perspective view of a side wall of the box, Figure 5 is a perspective view of the box bottom, Figure 6 is a fragmentary top plan view of one corner of the box with the top removed, and Figures 7 and 8 show sectional and elevational views respectively of the blocks within the box for supporting the vehicle axles.

The motor vehicle transporting box disclosed in this application is constructed of completely preformed sides, ends, a bottom and a top that are adapted to be assembled into box formation for securely encasing, protecting and for transporting a motor vehicle. A box of this character being of considerable proportions, especially relative to the length thereof, it is essential that the bottom, sides and top wall be properly braced by bars of particular dimensions and relation so that when the preformed units of the box are handled either for shipment in a knocked down condition or for assembling the same into box formation, injury or damage thereto will be practically eliminated and the waterproof covering of a flexible nature and the wood sheathing comprising the preformed units will also be protected. The wood sheathing of the preformed unit being arranged at right angles to the length thereof, it is essential that the sheathing strips be properly braced to prevent separation thereof and damage to the waterproof covering, such as paper or the like during handling of the same.

The accompanying drawings show one embodiment of the invention wherein the reference numeral 1 designates the bottom, 2 the sides, 3 the ends and 4 the top. The bottom 1 is preferably rectangular in plan view as illustrated in Figs. 1 and 5 and embodies a rectangular frame formed of side bars 5 and end bars 6, preferably constructed of two by six material that have the major transverse axes thereof perpendicularly positioned and with the ends associated as illustrated in Fig. 5. Spaced longitudinal brace bars 7, preferably of two by four dimensions extend between the end bars 6 and are mortised at their ends into said end bars at the lower edges thereof while transverse brace bars 8 of two by four material extend between the longitudinal side bars 5 and the longitudinal brace bars 7, the cross braces 8 being relatively positioned to accomplish the maximum bracing strength required for various types of motor vehicles.

A waterproof covering and wood sheathing are associated with the bottom 1, the lower side of the bottom being covered by a waterproof covering 9 that may be of any material desired, such as paper or the like and the wood sheathing 10 that is formed of strips extending at right angles to the longitudinal axis of the bottom is superposed upon the waterproof covering 9. As illustrated in Fig. 5, the waterproof covering and wood sheathing extends outwardly of the outer sides of the side and end bars 5 and 6 to accommodate the mounting of the sides and ends of the box.

The side wall 2 of the box being completely preformed, in a manner similar to the bottom 1 includes wood sheathing 10 and a waterproof covering 9 with the wood sheathing 10 extending at right angles to the length of the side wall. The brace bars for the side wall include an upper bar 11, preferably of two by four construction having its upper edge lying flush with the adjacent edges of the sheathing strips 10 as illustrated in Fig. 4 while vertical end braces 12, preferably of one by four material flatly engage the waterproof covering 9 adjacent each end of the side wall and spaced slightly inwardly thereof as illustrated. A longitudinally extending brace bar 13, preferably of one by three material extends between the lower ends of the vertical end brace bars 12 with the lower side thereof flush with the lower ends of the end brace bars and disposed upwardly from the lower edge of the side wall a distance substantially equal to the height of the two by six side bars of the bottom. A central vertical brace bar 14 extends between the upper and lower longitudinal brace bars 11 and 13 and diagonally arranged brace bars 15, preferably of one by four construction, the brace bars 15 between the central brace bar 14 and the end brace bars 12 combining to form a substantial V-formation as illustrated.

The end wall 3, shown in detail in Fig. 2 includes the wood sheathing 10 and waterproof covering 9, the wood sheathing being vertically positioned and arranged at right angles to the length of the end wall while a longitudinally extending upper brace bar 16, preferably of two by four material has its upper edge lying flush with the upper edges of the sheathing strips. Crossed brace bars 17, preferably of one by four material are carried by the end walls, the upper ends thereof being angularly cut for flat abutting engagement with the lower face of the upper brace bar 16 while the lower ends thereof are angularly cut as at 18 and spaced upwardly from the lower edges of the end walls a distance equal to the height of the end bars 6 of the bottom. The outer ends of the cross brace bars 17 and the upper brace bar 16 are spaced inwardly from the side edges of the end walls.

The top 4 embodies wood sheathing 10 and a waterproof covering 9, the sheathing strips being retained in assembled formation by the crossed brace bars 19 having their ends angularly cut as at 20 and 21 and spaced from the edges of the top while longitudinally extending brace bars 22 are positioned between the crossed brace bars 19 adjacent the side edges of the top as illustrated in Fig. 3, the crossed braces 19 and the longitudinally extending braces 22 being preferably of one by four material.

To facilitate the rigid supporting and mounting of a motor vehicle within the box, a block 23 is suitably anchored within the box and has a horizontal opening 24 to receive the projecting end of an axle, this block formation being illustrated in Figs. 7 and 8.

The several units of the transporting box being completely preformed, the same are designed in a manner to permit proper assembling thereof into box formation as illustrated in Fig. 1, the sides 2 having the longitudinal brace bars 13 thereof supported on the side bars 5 of the bottom with the lower extending edges of the side walls engaging the laterally projecting portions of the waterproof covering and wood sheathing on the bottom. The end walls 3 are placed in position with the diagonally cut edges 18 of the crossed braces 17 resting upon the end bars 6 with the lower edges of the end walls resting upon the projecting ends of the waterproof covering and wood sheathing as will be clearly understood from an inspection of the drawings. The top 4 is placed in position with the angle edges 20 engaging the inner faces of the upper brace bars 11 of the side walls while the angle cut edges 21 of the brace bars 19 of the top contact the upper brace bars 16 of the end wall. With the several units of the box assembled in this manner, the same are secured in position as by nailing or the like and a substantial and rigid box construction is afforded for the safe transportation of motor vehicles. The several preformed units are readily collapsible for unloading a motor vehicle and also for shipping the box in a collapsed or knock down condition and by the particular arrangement of the brace bars associated with each unit, the several units comprising the box are properly braced and are designed to withstand considerable weight and pressure as well as rough handling. If desired, the corners of the box may be further braced by the vertical bars 25 as shown in Figs. 1 and 6 that are anchored at its upper and lower ends as illustrated in Fig. 1 to the upper brace bar 16 of the end wall and the end bar 6 of the bottom.

From the above detail description of the box, it is believed that the construction and operation thereof will at once be apparent, and while there is herein shown and described the preferred embodiment of the present invention it is nevertheless to be understood that minor changes may be made therein without departing from the spirit and scope of the invention as claimed.

What is claimed as new is:—

1. In a transporting box for motor vehicles, a box fabricated in units consisting of completely preformed sides, a top, a bottom and ends, each unit including a series of sheathing strips, a longitudinal brace bar for each end and longitudinally extending brace bars for each of the other units to strengthen and retain the sheathing in position, each side having the longitudinal brace bars, one arranged contiguous to the upper edge and the other parallel with and spaced from the lower edge, frame bars on the bottom to receive and support the last named brace bars and diagonal brace bars on the top to engage the brace bars on the upper ends of the sides.

2. In a transporting box for motor vehicles, a box fabricated in units consisting of completely preformed sides, a top, a bottom and ends, each unit including a series of sheathing strips, a longitudinal brace bar for each end and longitudinally extending brace bars for each of the other units to strengthen and retain the sheathing in position, the top embodying brace bars crossed intermediate their ends with the longitudinally extending brace bars abutting at their ends the sides of the crossed brace bars at points spaced from the ends thereof and lying parallel with the side edges of the top, each side having the longitudinal brace bars, one arranged contiguous to the upper edge and the other spaced from and parallel with the lower edge, spaced vertical brace bars carried by the sides, diagonally arranged brace bars positioned between the vertical brace bars and abutting the longitudinal brace bars at their ends, the brace bars carried by the bottom being spaced from the side edges thereof and frame bars on edge carried by the bottom forming supports for the lower longitudinal brace bars on the sides and adjacent portions of the brace bars on the ends.

3. In a transporting box for motor vehicles, a box fabricated in units consisting of completely preformed sides, a top, a bottom and ends, each unit including a series of sheathing strips, a longitudinal brace bar for each end and longitudinally extending brace bars for each of the other units to strengthen and retain the sheathing in position, diagonal brace bars on the sides and ends and side and end bars carried by the bottom to receive and support the lowermost longitudinal brace bars carried by the sides and the diagonal brace bars carried by the ends.

In testimony whereof I affix my signature.

EDWARD S. EVANS.